(12) United States Patent
Ito

(10) Patent No.: US 10,096,084 B2
(45) Date of Patent: Oct. 9, 2018

(54) DISPLAY DEVICE

(71) Applicant: Onkyo Corporation, Osaka (JP)

(72) Inventor: Kazunari Ito, Osaka (JP)

(73) Assignee: Onkyo Corporation, Osaka (JP)

( * ) Notice: Subject to any disclaimer, the term of this patent is extended or adjusted under 35 U.S.C. 154(b) by 316 days.

(21) Appl. No.: 14/548,727

(22) Filed: Nov. 20, 2014

(65) Prior Publication Data

US 2015/0153920 A1 Jun. 4, 2015

(30) Foreign Application Priority Data

Nov. 29, 2013 (JP) .................. 2013-246912

(51) Int. Cl.
*G06F 3/00* (2006.01)
*G06T 1/60* (2006.01)
(Continued)

(52) U.S. Cl.
CPC .............. *G06T 1/60* (2013.01); *G11B 19/025* (2013.01); *G11B 27/34* (2013.01)

(58) Field of Classification Search
CPC .......... H04N 1/00307; G06F 17/30265; G07F 17/32
See application file for complete search history.

(56) References Cited

U.S. PATENT DOCUMENTS 6,271,841 B1 * 8/2001 Tsujimoto ............. G06T 11/001
715/839
2003/0120555 A1 * 6/2003 Kitagawa ........... G01C 21/3623
705/26.1

(Continued)

FOREIGN PATENT DOCUMENTS

JP H05-314741 11/1993
JP H06-180981 6/1994
(Continued)

OTHER PUBLICATIONS

Japanese Decision to Grant with translation to corresponding Japanese Application No. 2013246912 dated Mar. 24, 2015.
(Continued)

*Primary Examiner* — Nicholas Augustine
(74) *Attorney, Agent, or Firm* — Renner Otto Boisselle & Sklar, LLP

(57) ABSTRACT

A program causing hardware to act as a unit is simplified without increasing a processing load on the hardware, the unit receiving operation to update display of information and instructing to update the display of the information, the display of the information being displayed on a display unit.

In case that a key processor instructs to update display information, an information access processor instructs an information storage to update the display information, and instructs the display processor to update the display of the information. The information storage updates the display information stored therein on a basis of the instruction to update the display information by the information access processor. The display processor causes the display unit to display the information based on the display information updated by the information storage, in case that the information access processor instructs to update the display of the information.

3 Claims, 16 Drawing Sheets

(51) Int. Cl.
    *G11B 27/34*    (2006.01)
    *G11B 19/02*    (2006.01)
    *G06F 3/01*    (2006.01)

(56) References Cited

U.S. PATENT DOCUMENTS

| | | | | |
|---|---|---|---|---|
| 2005/0114901 | A1* | 5/2005 | Yui | H04N 7/163 |
| | | | | 725/100 |
| 2006/0013462 | A1* | 1/2006 | Sadikali | G06F 19/3406 |
| | | | | 382/132 |
| 2010/0048302 | A1* | 2/2010 | Lutnick | G07F 17/32 |
| | | | | 463/42 |
| 2014/0067957 | A1* | 3/2014 | Yamada | H04L 65/403 |
| | | | | 709/204 |

FOREIGN PATENT DOCUMENTS

| | | |
|---|---|---|
| JP | H09-091938 | 9/1995 |
| JP | H11-053872 | 2/1999 |
| JP | 2003-100068 | 4/2003 |
| JP | 2013-152327 | 8/2013 |

OTHER PUBLICATIONS

Japanese Office Action with translation to corresponding Japanese Application No. 2013-246912 dated Jan. 27, 2015.

\* cited by examiner

FIG. 6

| Row number | Display mode | Display information | Display processor |
|---|---|---|---|
| 1-1 | Track number + title display mode | Track number | Track number display processor |
| 1-2 | | Display mode | |
| 1-3 | | Title | Title display processor |
| 1-4 | | Track number | Track number display processor |
| 1-5 | | Display mode | |
| 2-1 | Volume display mode | Volume | Volume display processor |
| 2-2 | | Display mode | |

Track number and title display
(Track number + title display mode)

Track number  Title

Volume display
(Volume display mode)

Volume

DISPLAY DEVICE

BACKGROUND OF THE INVENTION

1. Field of the Invention

The present invention relates to a display device provided with a display unit displaying information.

2. Description of the Related Art

A music playback device, such as a CD player, which plays back music includes a display unit such as an LCD (Liquid Crystal Display) and a fluorescent display tube, and the music playback device acts as a display device that displays information (for example, see Japanese Patent Publication Laid-Open No. 2013-152327). As illustrated in FIG. 11A, the display unit included in the music playback device displays a track number of the music and a title of the music such that a user easily selects the music to be played back. As illustrated in FIG. 11B, the display unit also displays information indicating how much volume (magnitude of sound) is set to the music playback device. In order to reduce cost of the music playback device, sometimes the track number of the music, the title of the music, and the volume cannot be displayed at one time in case that a small display unit is used. Therefore, sometimes a track number+ title display mode in which the track number of the music and the title of the music are displayed as illustrated in FIG. 11A and a volume display mode in which the volume is displayed as illustrated in FIG. 11B are switched. The music playback device includes a display switching key used to receive operation to switch the display mode, a track-up key used to receive operation to increase the track number, and a playback stopping key used to receive operation to stop the playback of the music. At this point, for example, the display mode is switched in the case that the operation of the display switching key is received.

FIG. 12 is a view illustrating a functional block of a microcomputer included in the music playback device. As illustrated in FIG. 12, a microcomputer 100 acts as an information storage 101, a music playback processor 102, a display switching key processor 103, a track-up key processor 104, a playback stopping key processor 105, and a display processor 106. The microcomputer 100 acts as each unit (software module) by an independent program, and each unit transmits and receives an instruction and information through inter-module communication indicated by an arrow. A technique of developing the program while dividing the program into functional modules is frequently adopted in order to increase productivity.

The track number and title of the music, the track number of the currently playing-back music (hereinafter, also referred to as a "current track number"), the current volume, and the current display mode are stored in the information storage 101. The track number and title of the music are stored in the information storage 101 while correlated with each other. At this point, in the case that the music is not currently played back, namely, in the case that the playback is held, the current track number stored in the information storage 101 becomes the track number of the music to be played back. The music playback processor 102 plays back the music. The music playback processor 102 changes the currently playing-back music to the music corresponding to the next track number in response to an instruction from the track-up key processor 104 described later. At this point, the music playback processor 102 acquires the track number of the next music to be played back from the information storage 101. The music playback processor 102 stops the playback of the music in response to an instruction from the playback stopping key processor 105 described later.

Then, processing operation performed by the display switching key processor 103 will be described with reference to a flowchart in FIG. 13. The display switching key processor 103 performs the following processing operation when receiving the operation of the display switching key 201. The display switching key processor 103 acquires the current display mode from the information storage 101 (S101). The display switching key processor 103 determines whether the acquired current display mode is the volume display mode (S102). In case of determining that the current display mode is the volume display mode (Yes in S102), the display switching key processor 103 sets the display mode from the volume display mode to the track number+ title display mode, and instructs the information storage 101 to update the display mode stored in the information storage 101 (S103). On the other hand, in case of determining that the current display mode is not the volume display mode, namely, that the current display mode is the track number+ title display mode (No in S102), the display switching key processor 103 sets the display mode from the track number+ title display mode to the volume display mode, and instructs the information storage 101 to update the display mode stored in the information storage 101 (S104). After the processing in S103 or S104, the display switching key processor 103 instructs the display processor 106 to update the display of the information (S105), and ends the processing.

Then, processing operation performed by the track-up key processor 104 will be described with reference to a flowchart in FIG. 14. The track-up key processor 104 performs the following processing operation when receiving the operation of the track-up key 202. The track-up key processor 104 acquires the current track number from the information storage 101 (S201). Then the track-up key processor 104 determines whether the acquired current track number is the final track number based on the track number stored in the information storage 101 (S202). For example, in the case that the track numbers are stored up to "10" in the information storage 101 while the current track number is "10", the track-up key processor 104 determines that the current track number is the final track number. For example, in the case that the track numbers are stored up to "10" in the information storage 101 while the current track number is "5", the track-up key processor 104 determines that the current track number is not the final track number. In case of determining that the current track number is the final track number (Yes in S202), the track-up key processor 104 ends the processing.

On the other hand, in case of determining that the current track number is not the final track number (No in S202), the track-up key processor 104 increases the current track number by one (for example, changes the current track number from "5" to "6"), and instructs the information storage 101 to update the current track number stored in the information storage 101 (S203). Then the track-up key processor 104 determines whether the music playback processor 102 currently plays back the music (S204). In case of determining that the music playback processor 102 currently plays back the music (Yes in S204), the track-up key processor 104 instructs the music playback processor 102 to play back the music corresponding to the next track number (S205). In response to the instruction, the music playback processor 102 changes the currently playing-back music to the music corresponding to the next track number. In case that the track-up key processor 104 determines that the music playback processor 102 does not currently play back the music (No in S204), or after the processing in S205, the track-up key processor 104 instructs the display processor 106 to update the display of the information (S206), and ends the processing.

Then, processing operation performed by the playback stopping key processor 105 will be described with reference to a flowchart in FIG. 15. The playback stopping key processor 105 performs the following processing operation when receiving the operation of the playback stopping key 203. The playback stopping key processor 105 determines whether the music playback processor 102 currently plays back the music (S301). In case of determining that the music playback processor 102 currently plays back the music (Yes in S301), the playback stopping key processor 105 instructs the music playback processor 102 to stop the playback (S302). In response to the instruction, the music playback processor 102 stops the playback of the music.

In case that the playback stopping key processor 105 determines that the music playback processor 102 does not currently play back the music (No in S301), or after the processing in S302, the playback stopping key processor 105 acquires the current track number from the information storage 101 (S303). The playback stopping key processor 105 determines whether the acquired current track number is "1" (S304). In case of determining that the acquired current track number is not "1" (No in S304), the playback stopping key processor 105 sets the track number to "1", and instructs the information storage 101 to update the current track number stored in the information storage 101 (S305). This is because the track number "1" and the title corresponding to the track number "1" are displayed after the stopping of the playback. Then, the playback stopping key processor 105 instructs the display processor 106 to update the display of the information (S306), and ends the processing. On the other hand, in case of determining that the acquired current track number is "1" (Yes in S304), the playback stopping key processor 105 ends the processing because the track number "1" and the title corresponding to the track number "1" are displayed after the stopping of the playback based on the display information stored in the information storage 101.

Then, processing operation performed by the display processor 106 will be described with reference to a flowchart in FIG. 16. The display processor 106 performs display update processing in FIG. 16 in the case that each of the processors 103 to 105 instructs the display processor 106 to update the display of the information (S105, S206, and S306). The display processor 106 acquires the current display mode from the information storage 101 (S401). Then the display processor 106 determines whether the acquired current display mode is the volume display mode (S402). In case of determining that the current display mode is the volume display mode (Yes in 402), the display processor 106 acquires the current volume from the information storage 101 (S403). The display processor 106 updates the display of the volume to the acquired current volume (S404).

On the other hand, in case of determining that the current display mode is not the volume display mode (No in S402), namely, that the current display mode is the track number+title display mode of, the display processor 106 acquires the current track number from the information storage 101 (S405). The display processor 106 updates the display of the track number to the acquired current track number (S406). The display processor 106 acquires the title corresponding to the acquired current track number from the information storage 101 (S407). The display processor 106 updates the display of the title to the acquired current title (S408).

As described above, when the track-up key 202 is operated, the track-up key processor 104 increases the track number by one, and causes the music playback processor 102 to play back the music corresponding to the next track number. At this point, when the current track number is the final track number (Yes in S202 of FIG. 14), the track-up key processor 104 does not perform the processing. That is, the track-up key processor 104 does not instruct the display processor 106 to update the display of the information. Even if the current track number is the final track number (Yes in S202 of FIG. 14), the track-up key processor 104 may instruct the display processor 106 to update the display of the information (Yes in 302 of FIG. 14, and processing S206). However, necessity to update the display is eliminated because the track number stored in the information storage 101 is not updated (the processing in S203 is not performed). The unnecessary processing increases a processing load on the microcomputer 100.

In order to suppress the processing load on the microcomputer 100, as illustrated in FIG. 14, the track-up key processer may instruct the display processor 106 to update the display of the information only in the case that the track-up key processor 104 instructs the information storage 101 to update the track number stored in the information storage 101, namely, only in the case that there is the necessity to instruct the display processor 106 to update the display of the information. However, when the track-up key processor 104 instructs the display processor 106 to update the display of the information, the program causing the microcomputer 100 to act as the track-up key processor 104 becomes complicated.

As described above, each of the key processors 103 to 105 instructs the display processor 106 to update the display of the information every time each of the operation keys 201 to 203 is operated. In the case that the display switching key processor 103 instructs to update the display of the information, because the display mode stored in the information storage 101 is updated from one of the display modes to the other display mode (S103 and S104), the display processor 106 updates one of the display modes to the other display mode (S404, S406, and S408). When the display mode is the volume display mode (Yes in S402), the display processor 106 updates the display of the volume (S404) even if the track-up key processor 104 instructs to update the display of the information. At this point, the unnecessary processing is performed, because the volume is not changed although the track number stored in the information storage 101 is updated while increased by one (S203). The unnecessary processing increases a processing load on the microcomputer 100.

In order to suppress the increase in processing load on the microcomputer 100, for example, it is possible that the track-up key processor 104 acquires the current display mode stored in the information storage 101, and the track-up key processor 104 does not instruct the display processor 106 to update the display of the information in the case that the display mode is the volume display mode. However, in this case, the program causing the microcomputer 100 to act as the track-up key processor 104 becomes complicated. In the case that the music playback device includes the large display unit in which the track number of the music, title of the music and the volume can concurrently be displayed, there is no necessity to switch the two display modes. In this case, because the track-up key processor 104 does not acquire the current display mode stored in the information storage 101 to determine whether the acquired current display mode is the volume display mode, there is the necessity to modify the program causing the microcomputer 100 to act as the track-up key processor 104. When the necessity to modify the program causing the microcomputer 100 to act as the track-up key processor 104 is generated depending on the display unit, flexibility of the program is degraded.

As described above, each of the key processors 103 to 105 performs the instruction to the display processor 106 to update the display of the information and the determination of the necessity to update the display of the information in order to suppress the increase in processing load on the microcomputer 100, which results in the problem that the program causing the microcomputer 100 to act as the each of the key processors 103 to 105 becomes complicated.

SUMMARY OF THE INVENTION

An object of the present invention is to simplify a program causing hardware to act as a unit without increasing a processing load on the hardware, the unit receiving operation to update display of information and instructing to update the display of the information, the display of the information being displayed on a display unit.

A display device comprising: a display unit that displays information; an operation unit for receiving operation of an instruction to update the information; an information storage in which display information to display the information is stored; a display processor that causes the display unit to display the information on a basis of the display information stored in the information storage; an operation processor that receives operation of the operation unit and instructs to update the display information; and an information access processor that instructs the information storage to update the display information, and instructs the display processor to update the display of the information, in case that the operation processor instructs to update the display information, wherein the information storage updates the display information stored therein on the basis of the instruction to update the display information by the information access processor, and the display processor causes the display unit to display the information based on the display information updated by the information storage in case that the information access processor instructs to update the display of the information.

In the present invention, in case that an operation processor instructs to update display information, an information access processor instruction an information storage to update the display information, and instructs a display processor to update the display of the information. Accordingly, the operation processor does not instruct the display processor to update the display of the information and determine necessity to instruct the display processor to update the display of the information, so that the program causing the hardware (for example, microcomputer) to act as the operation processor can be simplified without increasing the processing load on the hardware acting as the operation processor.

Preferably, wherein the display unit displays the information including first information and second information, the operation unit includes a first operation unit for receiving operation of an instruction to update the first information; the display information is stored in the information storage, the display information including first display information to display the first information, second display information to display the second information, and third display information, the third display information indicating one of a first display mode in which the first information is displayed on the display unit and a second display mode in which the second information is displayed on the display unit, the display processor causes display unit to switch and display the first information based on the first display information and the second information based on the second display information on the basis of the third display information stored in the information storage, the operation processor receives operation of the first operation unit, and instructs the information storage to update the first display information, the information access processor instructs the information storage to update the first display information, and instructs the display processor to update the display of the information, in case that the operation processor instructs to update the first display information, and when the third display information stored in the information storage is the first display mode, the information storage updates the first display information stored therein on the basis of the instruction to update the first display information by the information access processor, and the display processor causes the display unit to display the first information based on the first display information updated by the information storage when the information access processor instructs to update the display of the information.

In the present invention, the information access processor instructs the information storage to update first display information, and instructs the display processor to update the display of the information, in case that the operation processor instructs to update the first display information, and in case that third display information stored in the information storage is a first display mode, that is, the display unit displays first information. The display processor causes the display unit to display the first information on a basis of the first display information updated by the information storage. That is, the display processor updates the first information displayed on the display unit. In case that second information is displayed on the display unit, the display processor does not update the display of the information even if the first display information is updated. Therefore, useless processing in which the display processor updates the display of the information although the information is not updated is not generated, and the processing load on the hardware acting as the display processor does not increase.

In the present invention, the operation processor does not determine whether the display mode is the first display mode or a second display mode on the basis of the third display information stored in the information storage. In case that the operation processor is applied to a display device that does not switch between the first display mode and the second display mode, it is not necessary to modify the program causing the hardware to act as the operation processor. Accordingly, the program causing the hardware to act as the operation processor has high flexibility.

Preferably, wherein the operation unit further includes a second operation unit for receiving operation to switch between the display of the first information and the display of the second information, the operation processor receives operation of the second operation unit, and instructs to update the third display information, the information access processor instructs the information storage to update the third display information, and instructs the display processor to update the display of the information, in case that the operation processor instructs to update the third display information, the information storage updates the third display information stored therein on the basis of the instruction to update the third display information by the information access processor, and the display processor causes the display unit to display one of the first information and the second information on the basis of the third display information updated by the information storage in case that the information access processor instructs to update the display of the information.

In the present invention, in case that the operation processor instructs to update the third display information, the information access processor instructs an information storage to update the third display information, and instructs the display processor to update the display of the information. The display processor causes the display unit to display one of the first information and the second information on the basis of the third display information updated by the information storage. That is, in case that the information storage updates the third display information from the first display mode to the second display mode, the display processor causes the display unit to display the second information on the basis of the updated information. In case that the information storage updates the third display information from the second display mode to the first display mode, the display processor causes the display unit to display the first information on the basis of the updated information. That is, the display device receives operation of the second operation unit to switch between the display of the first information and the display of the second information on the display unit. Accordingly, the user can switch and confirm the first information and the second information by operating the second operation unit.

BRIEF DESCRIPTION OF THE DRAWINGS

FIG. 6 is a view illustrating an example of a management table;

DETAILED DESCRIPTION OF THE PREFERRED EMBODIMENTS

Figure 1:
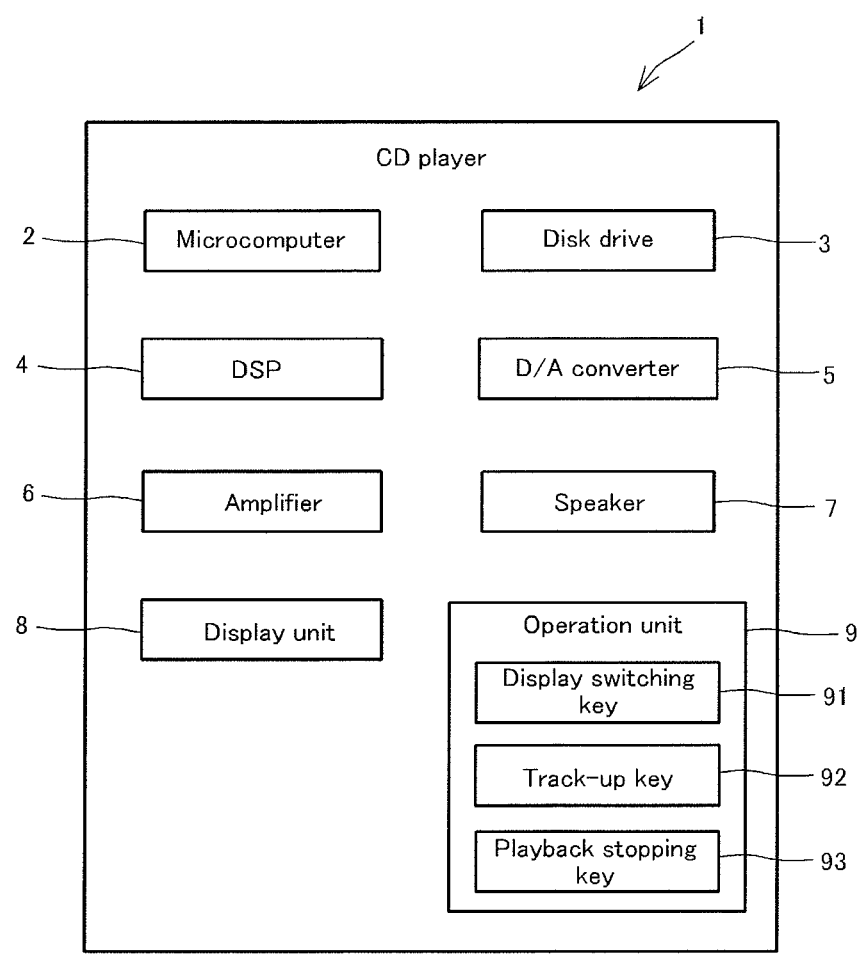
FIG. 1 is a block diagram illustrating a configuration of a CD player according to an embodiment of the present invention.

Hereinafter, a preferred embodiment of the present invention will be described. A CD player to which a display device according to the invention is applied will be described by way of example. FIG. 1 is a block diagram illustrating a configuration of a CD player according to an embodiment. A CD player 1 (display device) reads data recorded in a CD and plays back music. As illustrated in FIG. 1, the CD player 1 includes a microcomputer 2, a disk drive 3, a DSP (Digital Signal Processor) 4, a D/A converter 5, an amplifier 6, a speaker 7, a display unit 8, and an operation unit 9.

Figure 2:
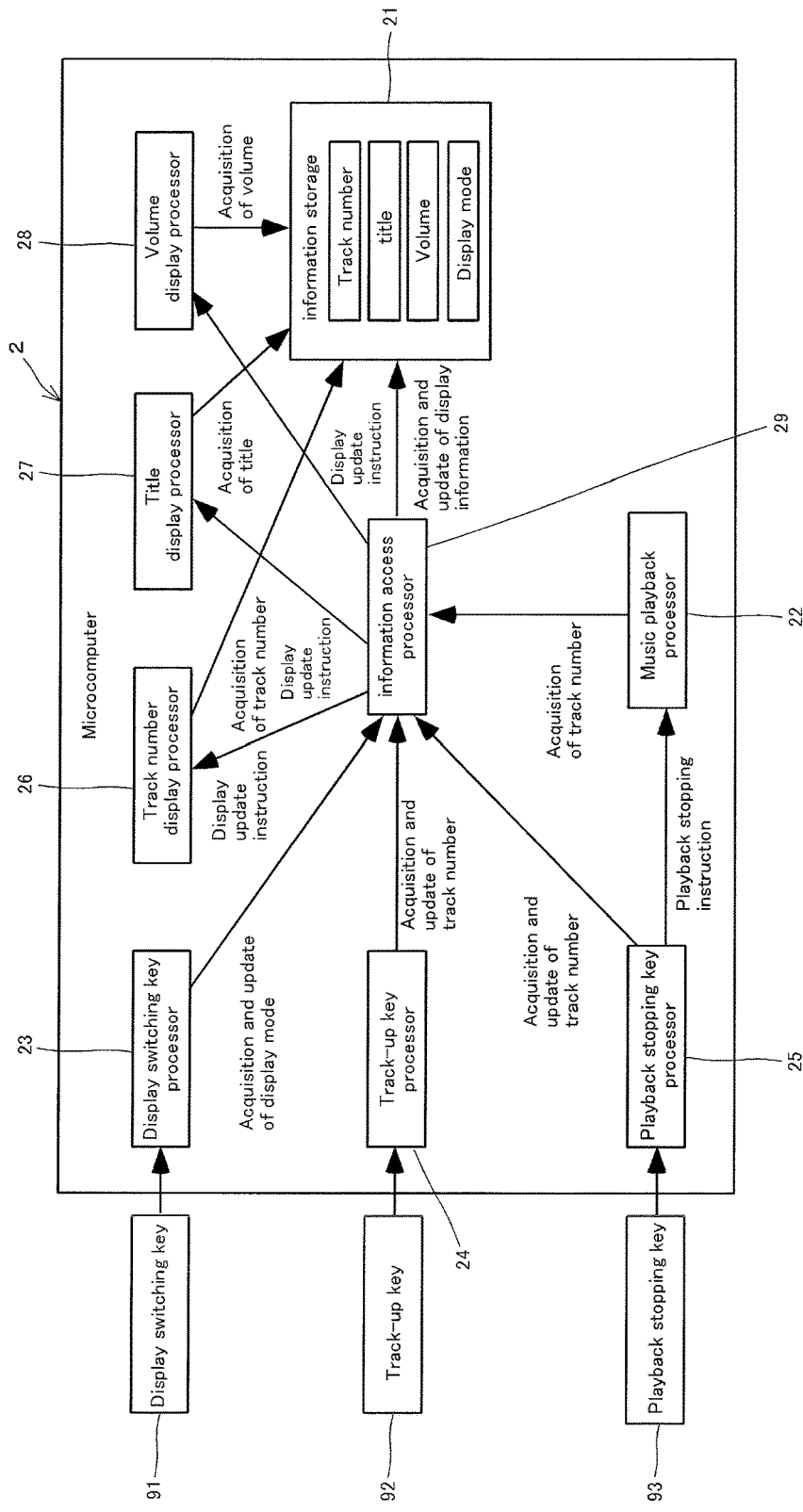
FIG. 2 is a view illustrating a functional block of a microcomputer.

The microcomputer 2 is constructed with hardware such as a CPU (Central Processing Unit), a ROM (Read Only Memory), a RAM (Random Access Memory), and an input and output interface. The CPU controls the hardware constituting the microcomputer 2 so as to act as functional units such as an information storage 21 as illustrated in FIG. 2 according to a program stored in the ROM. The functional units such as the information storage 21 may be constructed with an electronic circuit dedicated to calculation processing in each functional unit, or the functional units may have other configurations. The microcomputer 2 is described in detail later.

The disk drive 3 reads data recorded in a CD, and outputs the data to the DSP 4. The disk drive 3 reads the data and stops the read of the data under the control of the microcomputer 2 (specifically, a music playback processor 22 (to be described)). The DSP 4 decodes the data read by the disk drive 3. The D/A converter 5 converts the data (digital audio signal) output from the DSP 4 into an analog audio signal. The amplifier 6 amplifies the analog audio signal output from the D/A converter 5. The speaker 7 outputs (plays back) the data recorded in the CD as music (audio) based on the analog audio signal output from the amplifier 6.

Figure 11A:
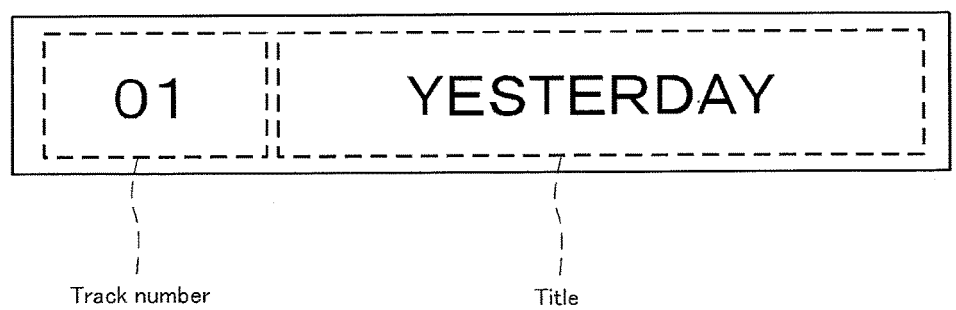
FIG. 11A is a view illustrating an example in which a track number of music and a title of music are displayed.
Figure 11B:
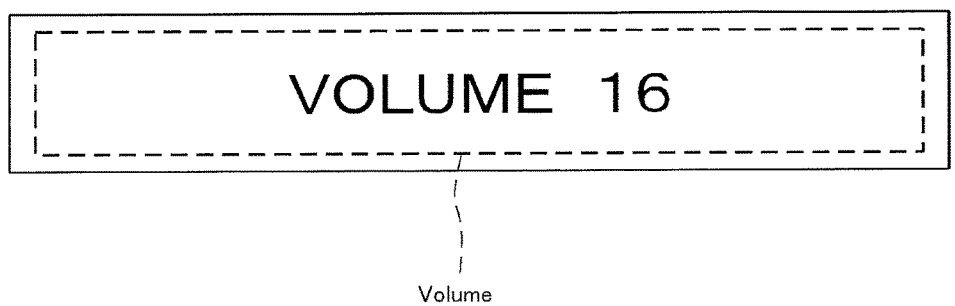
FIG. 11B is a view illustrating an example in which a volume is displayed.
Figure 12:
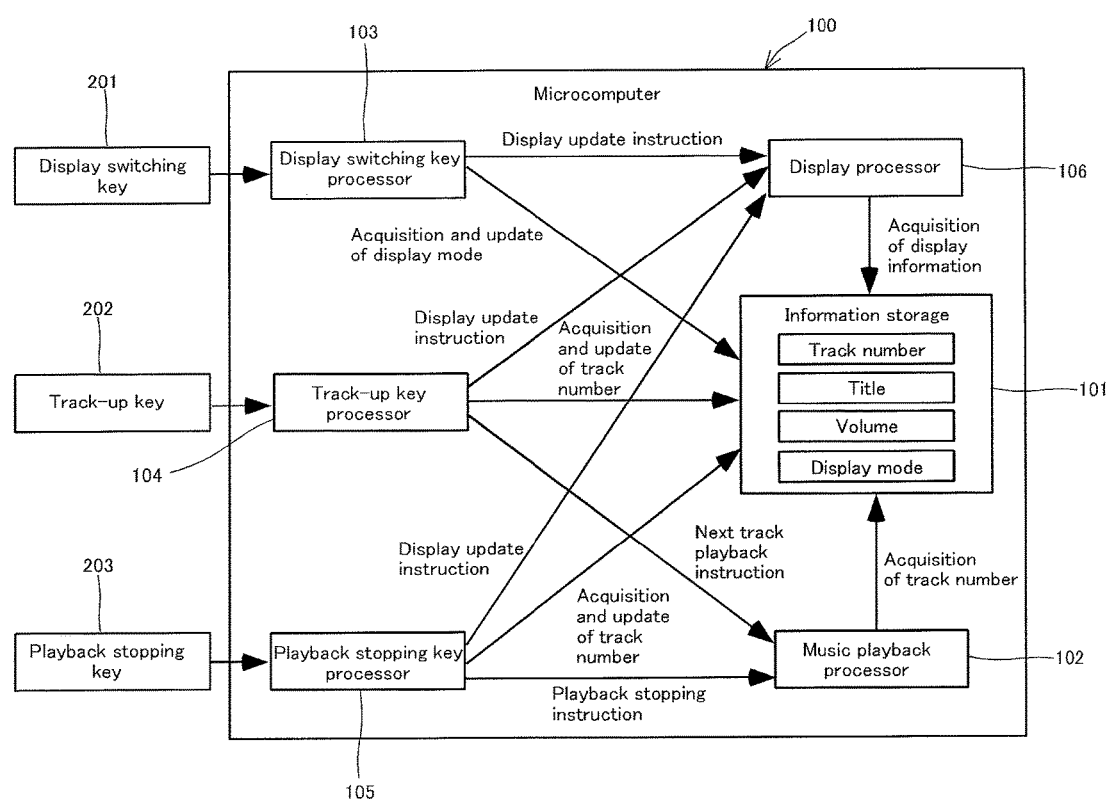
FIG. 12 is a view illustrating a functional block of a conventional microcomputer.
Figure 13:
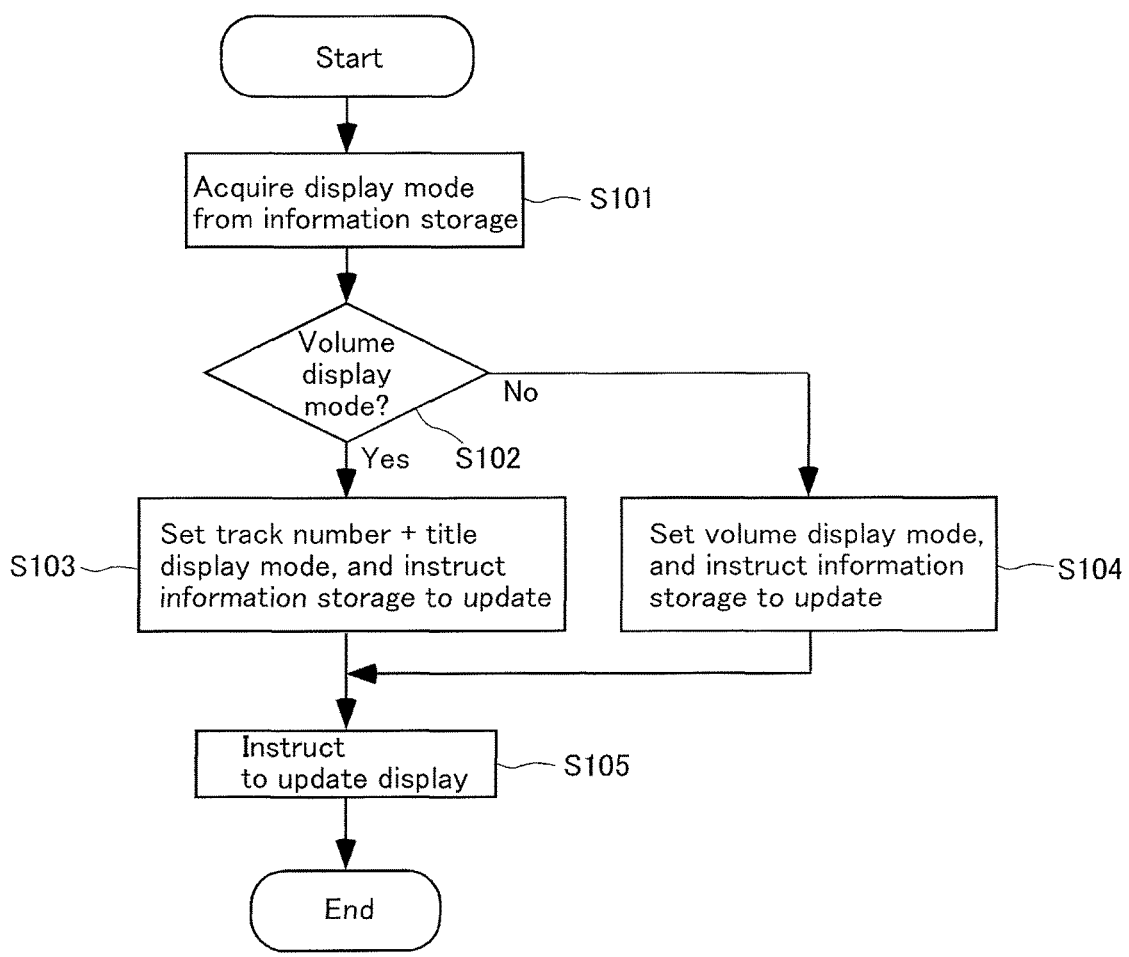
FIG. 13 is a flowchart illustrating a processing operation performed by a conventional display switching key processor.
Figure 14:
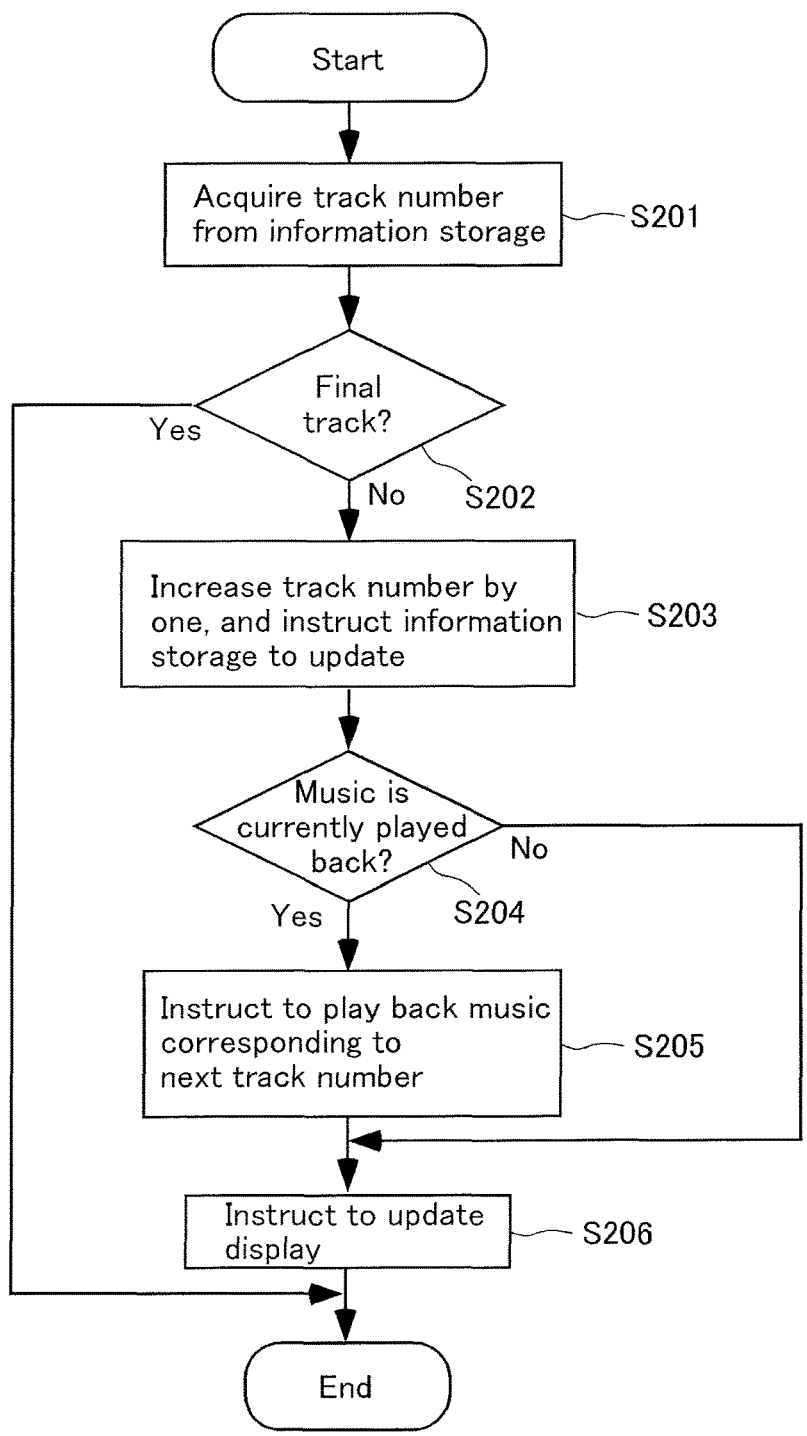
FIG. 14 is a flowchart illustrating a processing operation performed by a conventional track-up key processor.
Figure 15:
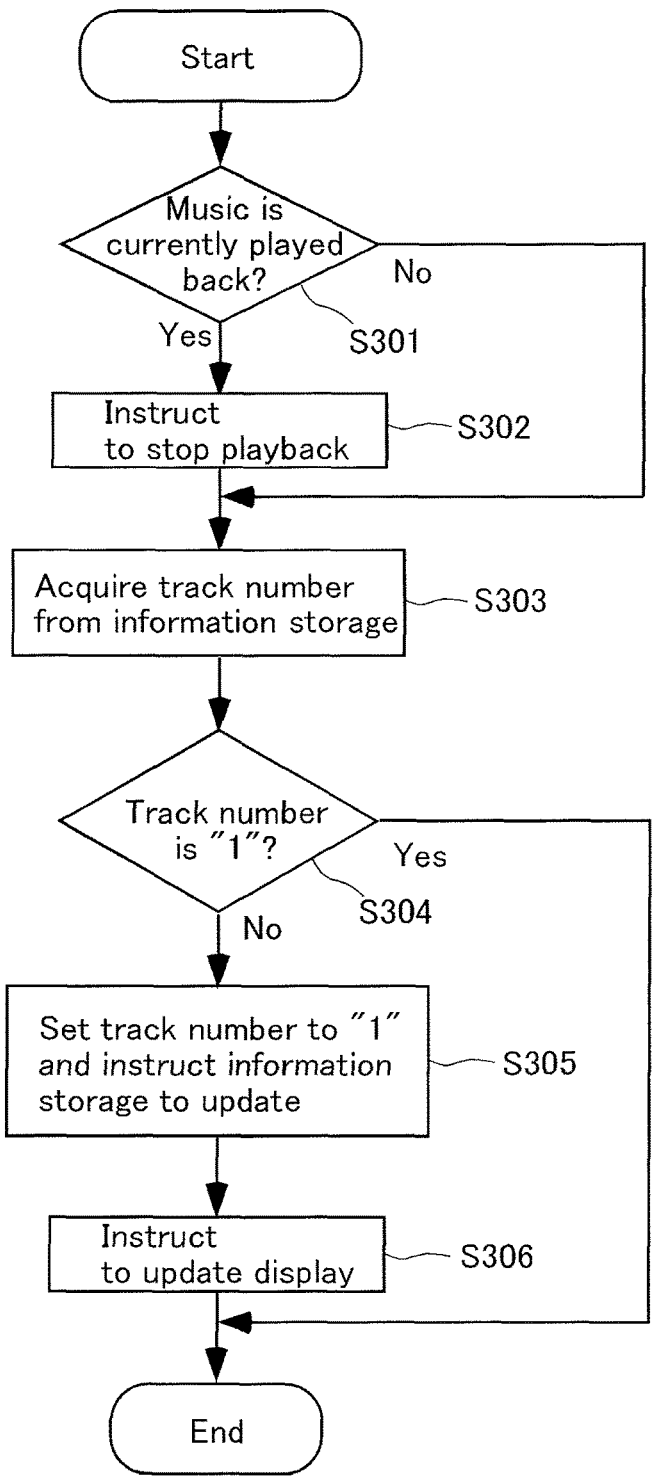
FIG. 15 is a flowchart illustrating a processing operation performed by a conventional playback stopping key processor.
Figure 16:
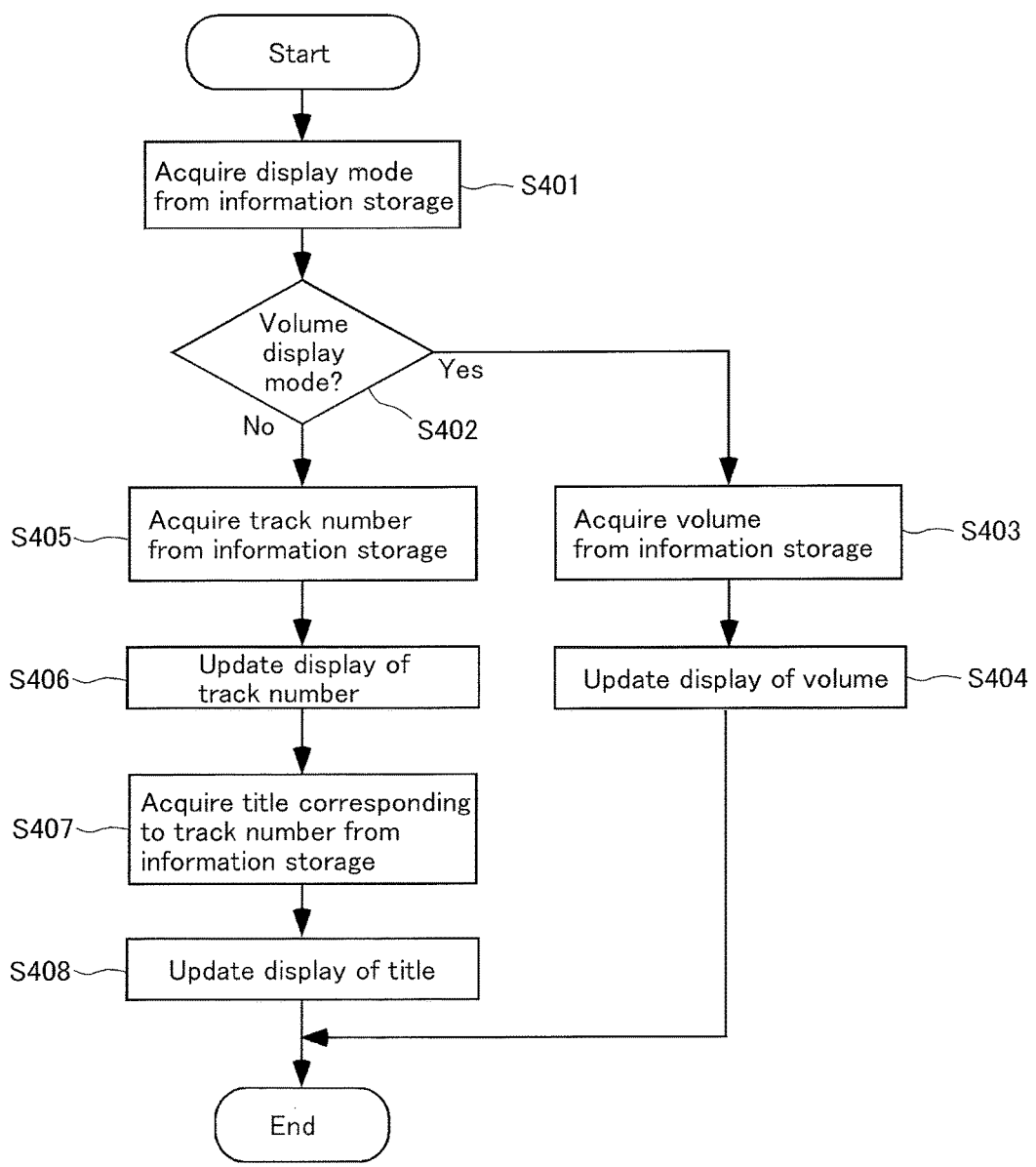
FIG. 16 is a flowchart illustrating a processing operation performed by a conventional display processor.

The display unit 8 displays information including a track number and a title (hereinafter, also referred to as a "current track number" and a "current title") of the currently playing-back music and current volume. For example, the display unit 8 is an LCD (Liquid Crystal Display) or a fluorescent display tube. In the display unit 8, the track number+ title display mode in FIG. 11A and the volume display mode in FIG. 11B are switched under the control of the microcomputer 2 (specifically, display processors 26 to 28 (to be described)). The track number and title (first information) of the currently playing-back music is displayed in the track number+ title display mode (first display mode). The current volume (second information) is displayed in the volume display mode (second display mode).

The operation unit 9 is for receiving user's operation. For example, the operation unit 9 is an operation key provided in a chassis of the CD player 1 and a remote controller. In the embodiment, the operation unit 9 includes a display switching key 91, a track-up key 92, and a playback stopping key 93. The display switching key 91 is for receiving operation to switch the display mode. The track-up key 92 is for receiving operation to increase the track number. The playback stopping key 93 is for receiving operation to stop the playback of the music. In the case that the operation keys 91 to 93 are operated, the information displayed on the display unit 8 is updated as needed basis. Accordingly, the operation keys 91 to 93 are for receiving operation to instruct to update the information. Specifically, the display switching key 91 (second operation unit) is for receiving operation to switch between the display of the current track number and title and the display of the current volume. The track-up key 92 and the playback stopping key 93 (first operation unit) are for receiving operation to instruct to update the current track number.

The microcomputer 2 will be described below. FIG. 2 is a view illustrating a functional block of the microcomputer 2. As illustrated in FIG. 2, the microcomputer 2 acts as the information storage 21, the music playback processor 22, a display switching key processor 23 (operation processor), a track-up key processor 24 (operation processor), a playback stopping key processor 25 (operation processor), a track number display processor 26 (display processor), a title display processor 27 (display processor), a volume display processor 28 (display processor), and an information access processor 29.

Display information to display the information on the display unit 6 is stored in the information storage 21. Specifically, the track number and title of the music, the current track number (first display information), the current volume (second display information), and the current display mode (third display information) are stored in the information storage 21. The track number and title of the music are stored in the information storage 21 while correlated with each other. At this point, in the case that the music is not currently played back, namely, in the case that the playback is held, the current track number stored in the information storage 21 becomes the track number of the music to be played back. The title of the music stored in the information storage 21 is extracted from the data recorded in the CD by the music playback processor 22 described later.

The music playback processor 22 plays back the music. The music playback processor 22 changes the currently playing-back music to the music corresponding to the next track number in response to an instruction from the track-up key processor 24 described later. At this point, the music playback processor 22 acquires the track number of the next music to be played back from the information storage 21. The music playback processor 22 stops the playback of the music in response to an instruction from the playback stopping key processor 25 described later. Specifically, the music playback processor 22 controls the data read and the stopping of the data read performed by the disk drive 3 to perform the playback of the music, the change of the playback to the music corresponding to the next track number, and the stopping of the playback of the music.

Figure 3:
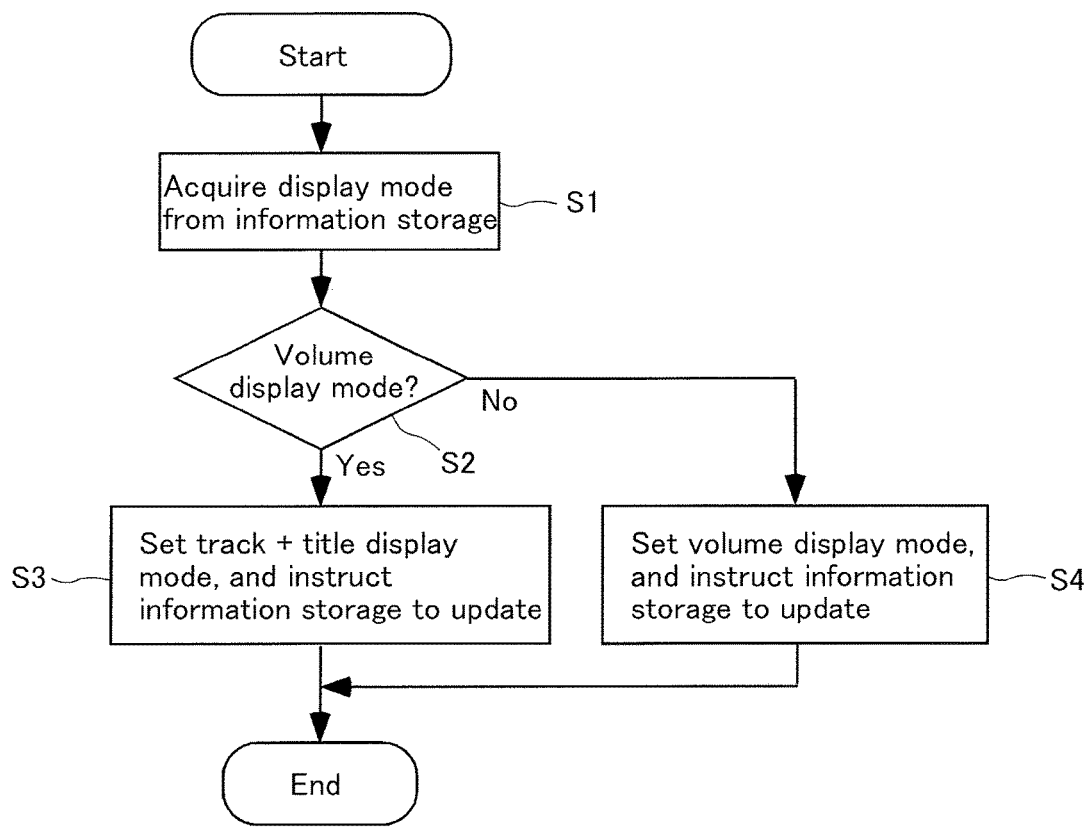
FIG. 3 is a flowchart illustrating a processing operation performed by a display switching key processor.

The display switching key processor 23 receives the operation of the display switching key 91, and instructs to update the display information. Then, processing operation performed by the display switching key processor 23 will be described with reference to a flowchart in FIG. 3. The display switching key processor 23 performs the following processing operation when receiving the operation of the display switching key 201. The display switching key processor 23 acquires the current display mode from the information storage 21 through the information access processor 29 (S1). The display switching key processor 23 determines whether the acquired current display mode is the volume display mode (S2). In case of determining that the current display mode is the volume display mode (Yes in S2), the display switching key processor 23 sets the display mode from the volume display mode to the rack number+ title display mode, and instructs to the information storage 21 to update the display mode through the information access processor 29 (S3). On the other hand, in case of determining that the current display mode is not the volume display mode, namely, that the current display mode is the track number+ title display mode (No in S2), the display switching key processor 23 set the display mode from the track number+ title display mode to the volume display mode, and instructs the information storage 21 to update the display mode through the information access processor 29 (S4).

Figure 4:
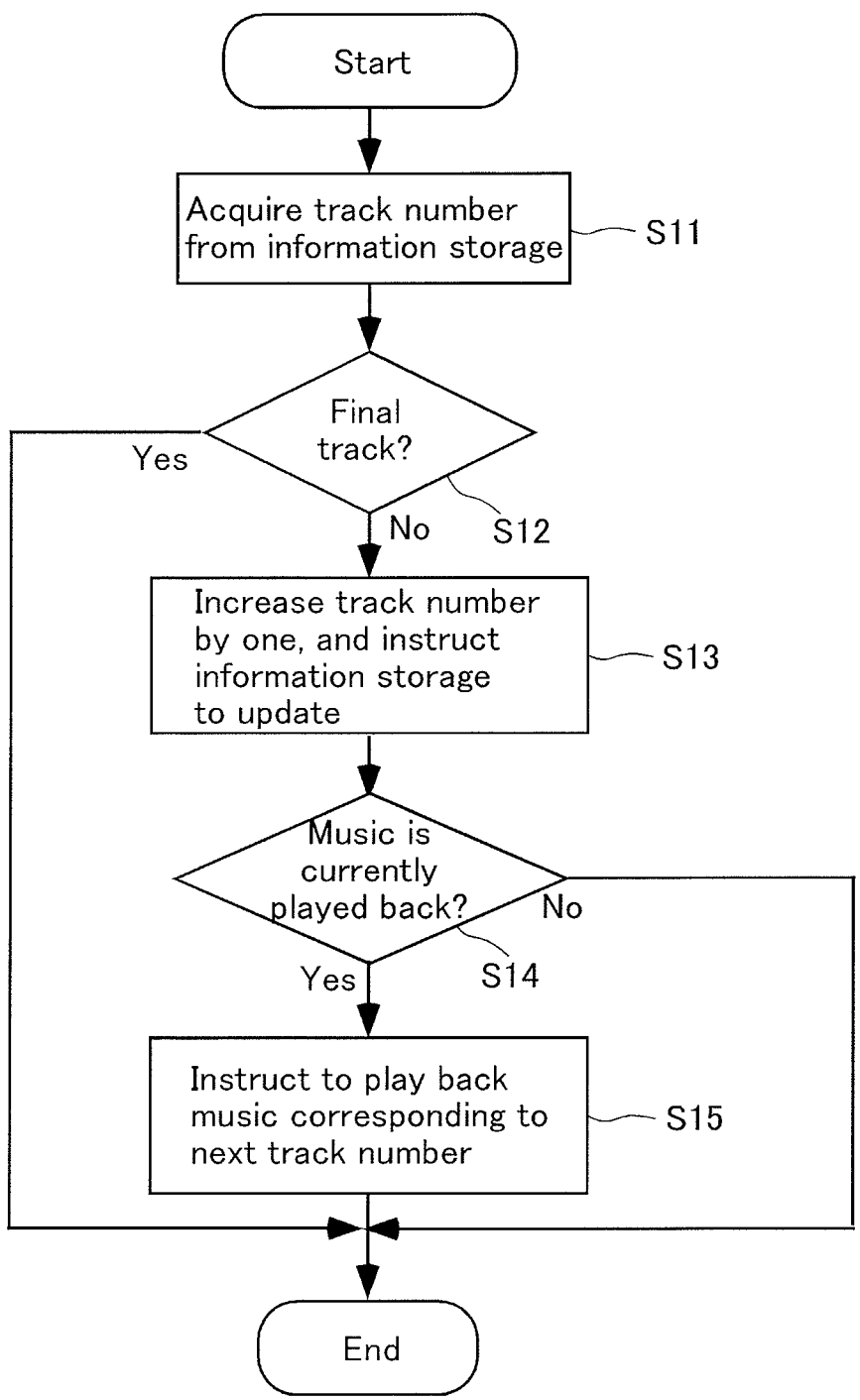
FIG. 4 is a flowchart illustrating a processing operation performed by a track-up key processor.

The track-up key processor 24 receives the operation of the track-up key 92, and instructs to update the display information. The track-up key processor 24 receives the operation of the track-up key 92, and instructs the music playback processor 22 to play back the music corresponding to the next track number. Then, processing operation performed by the track-up key processor 24 will be described with reference to a flowchart in FIG. 4. The track-up key processor 24 performs the following processing operation when receiving the operation of the track-up key 92. The track-up key processor 24 acquires the current track number from the information storage 21 through the information access processor 29 (S11). Then the track-up key processor 24 determines whether the acquired current track number is the final track number based on the track number stored in the information storage 21 (S12). For example, in the case that the track numbers are stored up to "10" in the information storage 21 while the current track number is "10", the track-up key processor 24 determines that the current track number is the final track number. For example, in the case that the track numbers are stored up to "10" in the information storage 21 while the current track number is "5", the track-up key processor 24 determines that the current track number is not the final track number. In case of determining that the current track number is the final track number (Yes in S12), the track-up key processor 24 ends the processing.

On the other hand, in case of determining that the current track number is not the final track number (No in S12), the track-up key processor 24 increases the current track number by one (for example, changes the current track number from "5" to "6"), and instructs the information storage 21 to update the current track number through the information access processor 29 (S13). Then the track-up key processor 24 determines whether the music playback processor 22 currently plays back the music (S14). In case of determining that the music playback processor 22 currently plays back the music (Yes in S14), the track-up key processor 24 instructs the music playback processor 22 to play back the music corresponding to the next track number (S15). In response to the instruction, the music playback processor 22 changes the currently playing-back music to the music corresponding to the next track number. In case of determining that the music playback processor 22 does not currently play back the music (No in S14), the track-up key processor 24 ends the processing.

Figure 5:
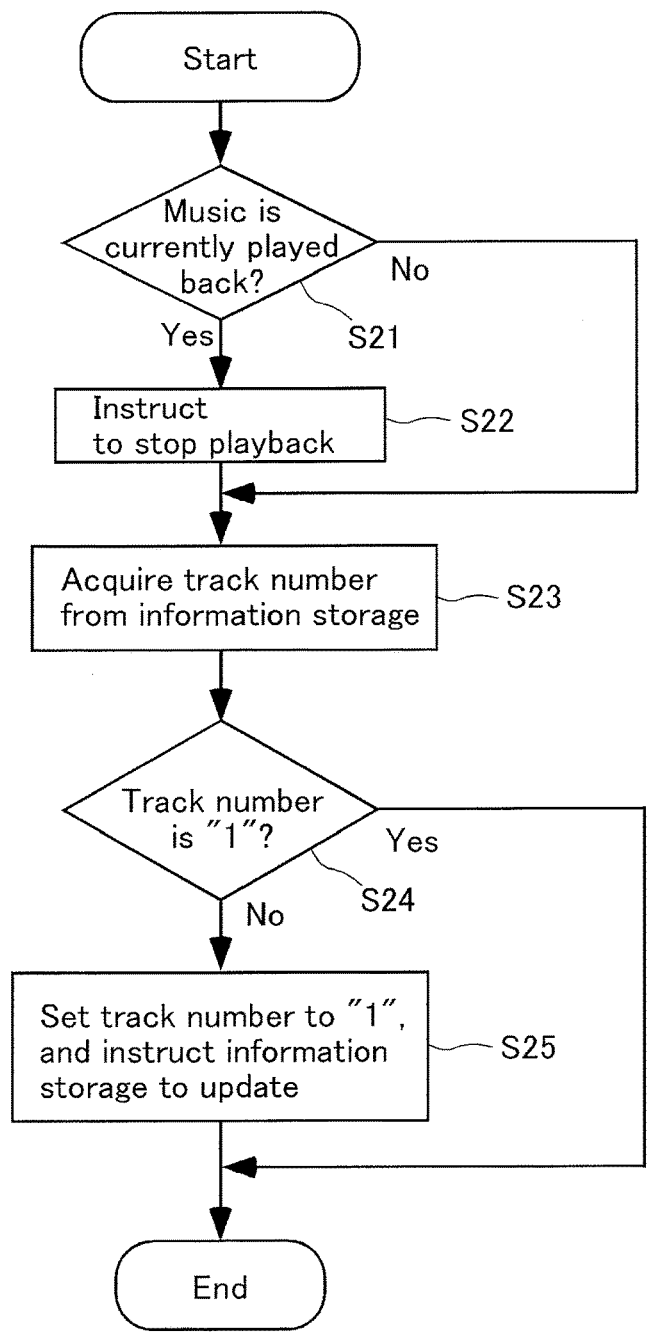
FIG. 5 is a flowchart illustrating a processing operation performed by a playback stopping key processor.

The playback stopping key processor 25 receives the operation of the playback stopping key 93, and instructs to update the display information. The playback stopping key processor 25 receives the operation of the playback stopping key 93, and instructs the music playback processor 22 to stop the playback of the music. Then, processing operation performed by the playback stopping key processor 25 will be described with reference to a flowchart in FIG. 5. The playback stopping key processor 25 performs the following processing operation when receiving the operation of the playback stopping key 93. The playback stopping key processor 25 determines whether the music playback processor 22 currently plays back the music (S21). In case of determining that the music playback processor 22 currently plays back the music (Yes in S21), the playback stopping key processor 22 instructs the music playback processor 22 to stop the playback (S22). In response to the instruction, the music playback processor 22 stops the playback of the music.

In case that the playback stopping key processor 25 determines that the music playback processor 22 does not currently play back the music (No in S21), or after the processing S22, the playback stopping key processor 25 acquires the current track number from the information storage 21 through the information access processor 29 (S23). The playback stopping key processor 25 determines whether the acquired current track number is "1" (S24). In case of determining that the acquired current track number is not "1" (No in S24), the playback stopping key processor 25 sets the track number to "1", and instructs the information storage 21 to update the current track number through the information access processor 29 (S25). This is because the track number "1" and the title corresponding to the track number "1" are displayed after the stopping of the playback. On the other hand, in case of determining that the acquired current track number is "1" (Yes in S24), the playback stopping key processor 25 ends the processing because the track number "1" and the title corresponding to the track number "1" are displayed after the stopping of the playback based on the display information stored in the information storage 21.

In the case that the key processors 23 to 25 instructs to update the display information, the information access processor 29 instructs the information storage 21 to update the display information, and instructs the display processors 26 to 28 to update the display of the information. Specifically, in the case that the track-up key processor 24 or the playback stopping key processor 25 instructs to update the current track number (S13 or S25), and in the case that the current display mode stored in the information storage 21 is the "track number+ title display mode", the information access processor 29 instructs the information storage 21 to update the current track number, and instructs the track number display processor 26 and the title display processor 27 to update the display of the information. In the case that the display switching key processor 23 instructs to update the display mode (S3 or S4), the information access processor 29 instructs the information storage 21 to update the display mode, and instructs the display processors 26 to 28 to update the display of the information.

FIG. 6 is a view illustrating an example of a management table included in the information access processor 29. The management table includes a row number field, a display mode field, a display information field, and a display processor field. A row number (such as "1-1") is stored in the row number field. The display mode information ("track number+ title display mode" and "volume display mode") is stored in the display mode field. At this point, the row number constitutes a "number-branch number", and the "track number+ title display mode" is stored in the display mode field corresponding to a number "1". The "volume display mode" is stored in the display mode field corresponding to a number "2". The display information ("track number", "title", and "display mode") is stored in the display information field. The information ("track number display processor", "title display processor", and "volume display processor") on the display processors 26 to 28 to which the information access processor 29 instructs to update the display of the information is stored in the display processor field.

Based on the management table, the information access processor 29 determines whether the information access processor 29 instructs the display processors 26 to 28 to update the display of the information, and determines which of the display processors 26 to 28 the information access processor 29 instructs to update the display of the information. Specifically, the information access processor 29 acquires the current display mode stored in the information storage 21. In case that the acquired current display mode is the "track number+ title display mode", the information access processor 29 compares the pieces of display information stored in the display information fields corresponding to row numbers "1-1" to "1-5" to the display information that the information access processor 29 instructs the information storage 21 to update one by one, and determines whether the pieces of display information stored in the display information fields corresponding to row numbers "1-1" to "1-5" are matched with the display information that the information access processor 29 instructs the information storage 21 to update. For example, in the case that the information access processor 29 instructs the information storage 21 to update the current track number, because the display information that the information access processor 29 instructs the information storage 21 to update is matched with the display information "track number" stored in the display information field corresponding to the row number "1-1", the information access processor 29 determines that the display information is matched with the display information "track number" stored in the display information field corresponding to the row number "1-1". The information access processor 29 instructs the display processors 26 to 28 stored in the display processor fields corresponding to the row numbers "1-1" to "1-5", which are matched with the display information that the information access processor 29 instructs the information storage 21 to update, to update the display of the information. For example, in case of determining that the display information that the information access processor 29 instructs the information storage 21 to update is matched with the display information "track number" stored in the display information field corresponding to the row number "1-1", the information access processor 29 instructs the "track number display processor" 26 stored in the display processor field corresponding to the row number "1-1" to update the display of the information. In the case that the display information that the information access processor 29 instructs the information storage 21 to update is the display information "track number" it is necessary to update the display of the title corresponding to the track number. Therefore, the information access processor 29 also instructs the "title display processor" 27 stored in the display processor field corresponding to the row number "1-4" which the "track number" is stored in the display information field to update the display of the information.

For example, in the case that the information access processor 29 instructs the information storage 21 to update the current display mode from the "volume display mode" to the "track number+ title display mode", because the display information is matched with the display information "display mode" stored in the display information field corresponding to the row number "1-2", the information access processor 29 determines that the display information is matched with the display information "display mode" stored in the display information field corresponding to the row number "1-2". The information access processor 29 instructs the "track number display processor" 26 stored in the display processor field corresponding to the row number "1-2" to update the display of the information. Because of the necessity to update the display of the title, the information access processor 29 also instructs the "title display processor" 27 stored in the display processor field corresponding to the row number "1-5" which the "display mode" is stored in the display information field to update the display of the information.

In case that the acquired current display mode is the "volume display mode", the information access processor 29 compares the pieces of display information stored in the display information fields corresponding to row numbers "2-1" and "2-2" to the display information that the information access processor 29 instructs the information storage 21 to update one by one, and determines whether the pieces of display information stored in the display information fields corresponding to row numbers "2-1" and "2-2" are matched with the display information that the information access processor 29 instructs the information storage 21 to update. For example, in the case that the information access processor 29 instructs the information storage 21 to update the current track number, because the display information "track number" is not stored in the display information fields corresponding to the row numbers "2-1" and "2-2", the information access processor 29 determines that the display information is not matched with the display information "track number". In this case, the information access processor 29 does not instruct the display processors 26 to 28 to update the display of the information.

Figure 7:
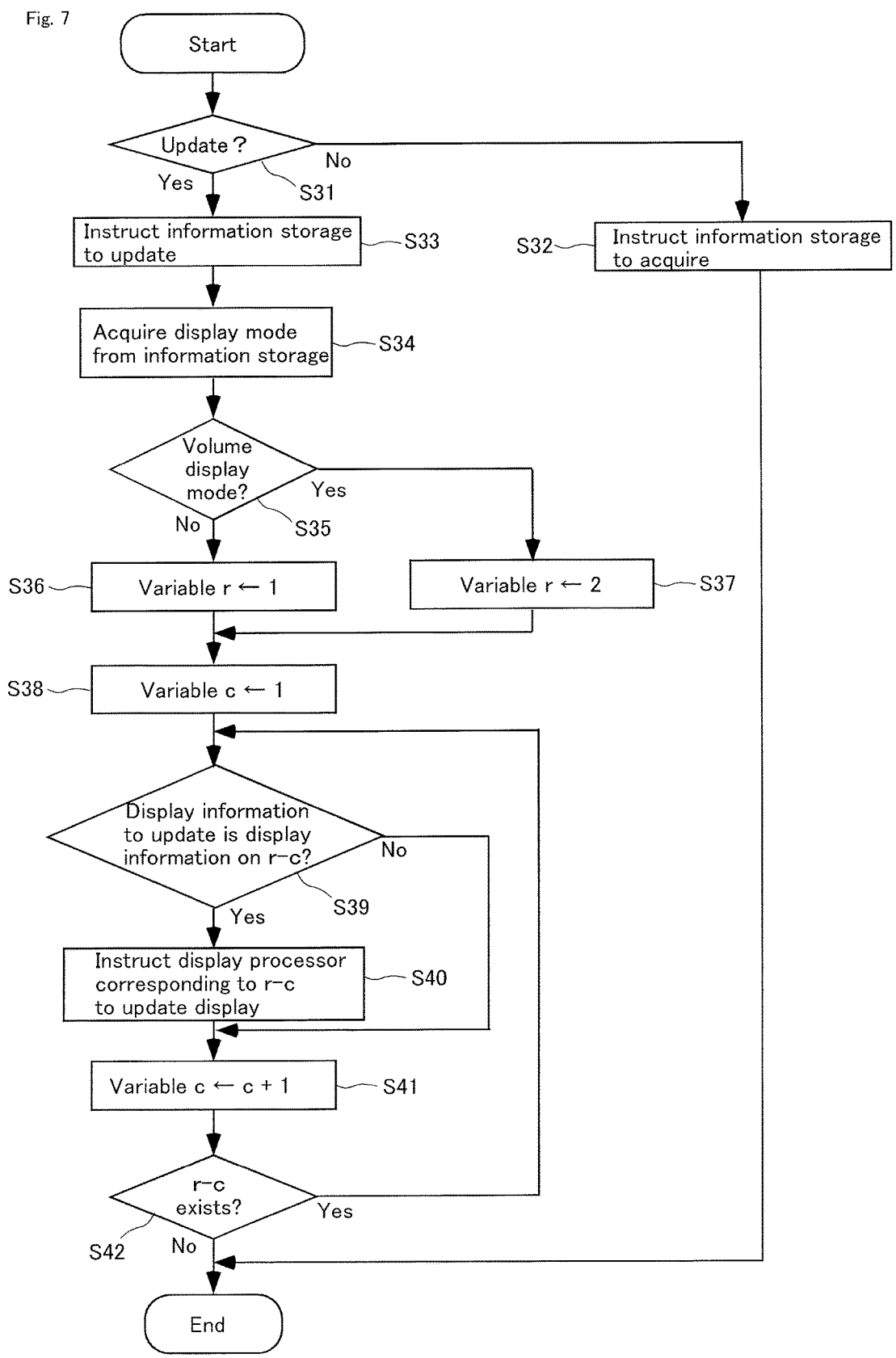
FIG. 7 is a flowchart illustrating a processing operation performed by an information access processor.

Then, processing operation performed by the information access processor 29 will be described with reference to a flowchart in FIG. 7. The information access processor 29 performs the following processing operation, when the key processors 23 to 25 instructs the information access processor 29 to acquire the display information or instructs the information access processor 29 to update the display information. The information access processor 29 determines whether the instruction is the instruction to update the display information (S31). Incase of determining that the instruction is not the instruction to update the display information, namely, that the instruction is the instruction to acquire the display information (No in S31), the information access processor 29 acquires the display information from the information storage 21 (S32). At this point, the information access processor 29 outputs the acquired display information to the key processors 23 to 25 that instructs to acquire the display information.

In case of determining that the instruction is the instruction to update the display information (Yes in S31), the information access processor 29 instructs the information storage 21 to update the display information (S33). The information access processor 29 acquires the current display mode from the information storage 21 (S34). The information access processor 29 determines whether the acquired current display mode is the volume display mode (S35). In case of determining that the current display mode is not the volume display mode, namely, that the current display mode is the track number+ title display mode (No in S35), the information access processor 29 sets a variable r corresponding to the number of the row number of the management table to 1 (S36). In case of determining that the current display mode is the volume display mode (Yes in S35), the information access processor 29 sets the variable r corresponding to the number of the row number of the management table to 2 (S37). After the processing in S36 or S37, the information access processor 29 sets a variable c corresponding to the branch number of the row number of the management table to 1 (S38). The information access processor 29 determines whether the display information that the information access processor 29 instructs the information storage 21 to update is matched with the display information stored in the display information field corresponding to a row number "r-c" (S39). Because of the row number "1-1" or "2-1" in the first-time processing, the information access processor 29 determines whether the display information that the information access processor 29 instructs the information storage 21 to update is matched with the display information stored in the display information field corresponding to the row number "1-1" or "2-1".

In case of determining that the display information that the information access processor 29 instructs the information storage 21 to update is matched with the display information stored in the display information field corresponding to the row number "r-c" (Yes in S39), the information access processor 29 instructs one of the display processors 26 to 28 stored in the display processor field corresponding to the row number "r-c" to update the display of the information (S40). In case that the information access processor 29 determines that the display information that the information access processor 29 instructs the information storage 21 to update is not matched with the display information stored in the display information field corresponding to the row number "r-c" (No in S39), or after the processing in S40, the information access processor 29 sets the variable c corresponding to the branch number of the row number of the management table to c+1 (S41). This is because whether the display information that the information access processor 29 instructs the information storage 21 to update is matched with the display information stored in the display information field corresponding to the next row number "r-c" is determined in the next processing in S39. For example, because the variable c changes from "1" to "2" in the processing in S41 after the first-time processing in S39, the row number becomes "1-2" or "2-2" in the second-time processing in S39. The information access processor 29 determines whether the display information that the information access processor 29 instructs the information storage 21 to update is matched with the display information stored in the display information field corresponding to the row number "1-2" or "2-2".

Then the information access processor 29 determines whether the row number "r-c" exists in the management table (S42). For the variable r of 1, the information access processor 29 determines that the row number "r-c" exists in the management table in the case that the variable c is 5 or less, and the information access processor 29 determines that the row number "r-c" does not exist in the management table in the case that the variable c is 6 or more. For the variable r of 2, the information access processor 29 determines that the row number "r-c" exists in the management table in the case that the variable c is 2 or less, and the information access processor 29 determines that the row number "r-c" does not exist in the management table in the case that the variable c is 3 or more. The information access processor 29 performs the processing in S39 in case of determining that the row number "r-c" exists in the management table (Yes in S42). On the other hand, in case of determining that the row number "r-c" does not exist in the management table (No in S42), the information access processor 29 ends the processing, because the information access processor 29 already determines whether the display information that the information access processor 29 instructs the information storage 21 to update is matched with the pieces of display information stored in the display information fields corresponding to the row numbers "1-1" to "1-5" or the row numbers "2-1" and "2-2".

The display processors 26 to 28 cause the display unit 8 to display the pieces of information on the current track number, the current title, and the current volume based on the display information (the current track number and the current volume) stored in the information storage 21. The display processors 26 to 28 cause the display unit 8 to display the information based on the display information updated by the information storage 21 in the case that the information access processor 29 instructs to update the display of the information. That is, the display processors 26 to 28 update the display of the display unit 8. The display processors 26 to 28 cause the display unit 8 to switch and display the pieces of information on the current track number and title or the current volume based on the current display mode stored in the information storage 21. That is, the display processors 26 to 28 cause the display unit 8 to switch and display the track number+ title display mode of and the volume display mode.

In the embodiment, the display processors 26 to 28 are constructed with the track number display processor 26 that causes the display unit 8 to display the current track number, the title display processor 27 that causes the display unit 8 to display the current title, and the volume display processor 28 that causes the display unit 8 to display the current volume. The track number display processor 26 causes the display unit 8 to display the current track number in the track number+ title display mode (see FIG. 11A). The title display processor 27 causes the display unit 8 to display the current title in the track number+ title display mode (see FIG. 11A). The volume display processor 28 causes the display unit 8 to display the current volume in the volume display mode (see FIG. 11B).

Figure 8:
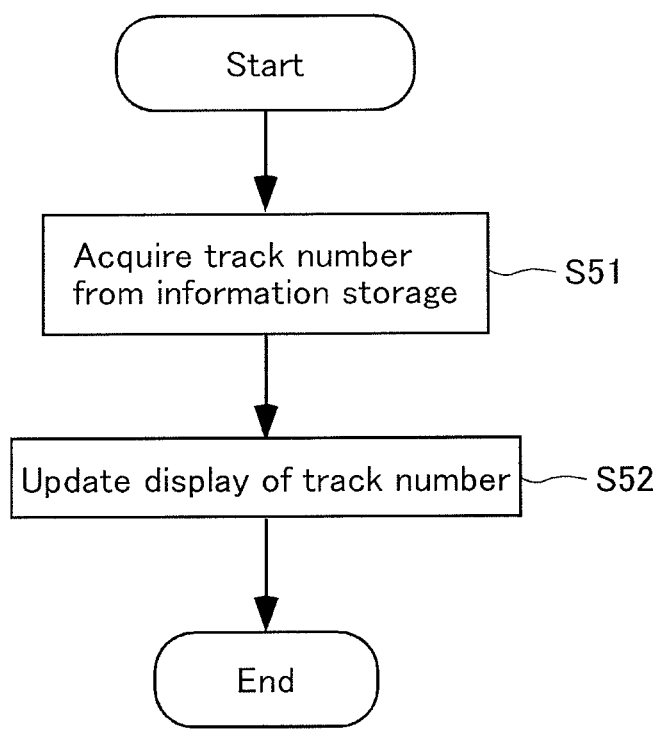
FIG. 8 is a flowchart illustrating a processing operation performed by a track number display processor.

Then, processing operation performed by the track number display processor 26 will be described with reference to a flowchart in FIG. 8. The track number display processor 26 performs display update processing in FIG. 8 in the case that the information access processor 29 instructs to update the display of the information. The track number display processor 26 acquires the current track number from the information storage 21 (S51). The track number display processor 26 causes the display unit 8 to display the acquired current track number, namely, updates the display of the track number to the acquired current track number (S52), and ends the processing.

Figure 9:
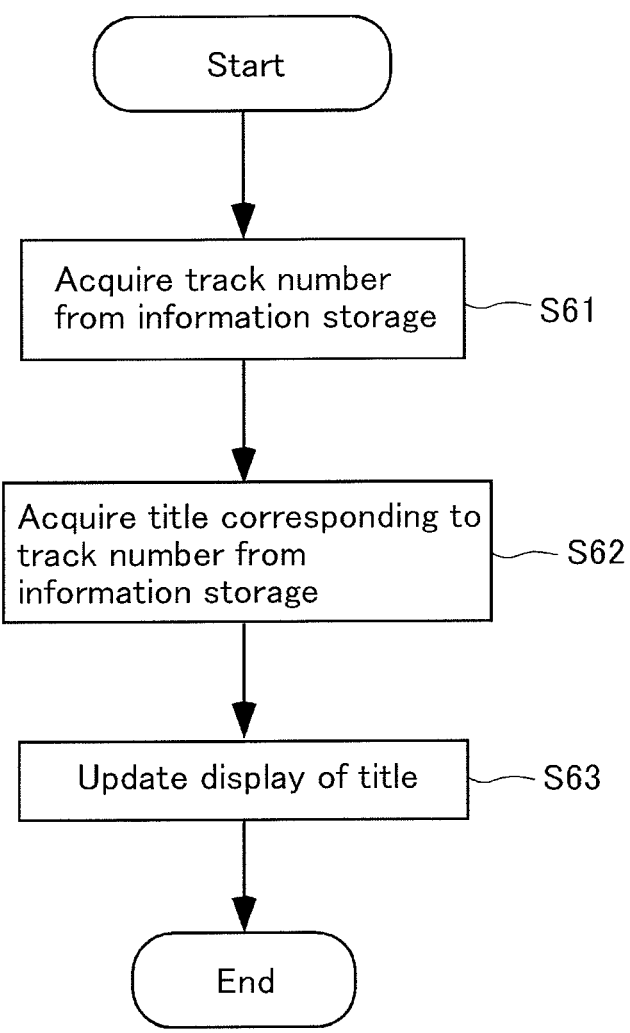
FIG. 9 is a flowchart illustrating a processing operation performed by a title display processor.

Then, processing operation performed by the title display processor 27 will be described with reference to a flowchart in FIG. 9. The title display processor 27 performs display update processing in FIG. 9 in the case that the information access processor 29 instructs to update the display of the information. The title display processor 27 acquires the current track number from the information storage 21 (S61). Then the title display processor 27 acquires the title corresponding to the acquired current track number from the information storage 21 (S62). The title display processor 27 causes the display unit 8 to display the acquired current title, namely, updates the display of the title to the acquired current title (S63), and ends the processing.

Figure 10:
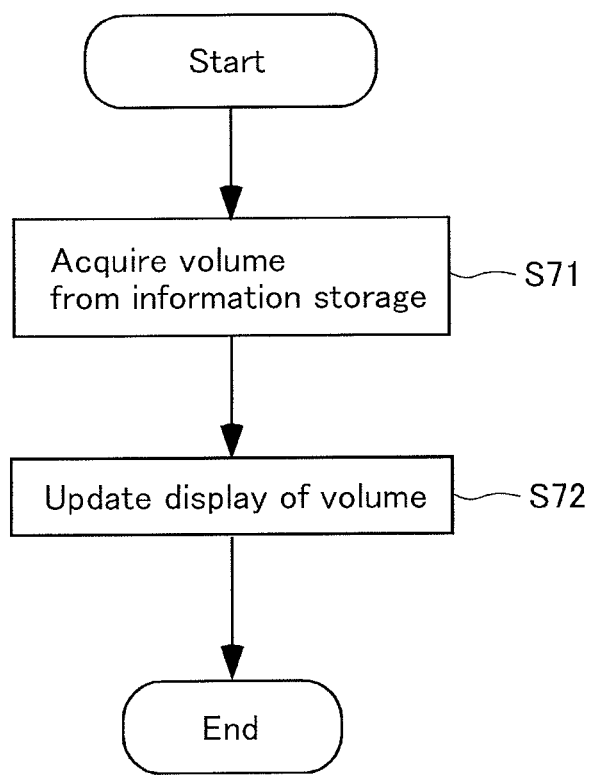
FIG. 10 is a flowchart illustrating a processing operation performed by a volume display processor.

Then, processing operation performed by the volume display processor 28 will be described with reference to a flowchart in FIG. 10. The volume display processor 28 performs display update processing in FIG. 10 in the case that the information access processor 29 instructs to update the display of the information. The volume display processor 28 acquires the current volume from the information storage 21 (S71). The volume display processor 28 causes the display unit 8 to display the acquired current volume, namely, updates the display of the volume to the acquired current volume (S72), and ends the processing.

As described above, in the embodiment, in the case that the key processors 23 to 25 instructs to update the display information, the information access processor 29 instructs the information storage 21 to update the display information, and instructs one of the display processors 26 to 28 to update the display of the information. Accordingly, the key processors 23 to 25 do not instruct the display processors 26 to 28 to update the display of the information and determine the necessity to instruct the display processors 26 to 28 to update the display of the information, so that the program causing the microcomputer 2 to act as the key processors 23 to 25 can be simplified without increasing the processing load on the microcomputer 2 acting as the key processors 23 to 25.

In the embodiment, in the case that the track-up key processor 24 or the playback stopping key processor 25 instructs to update the current track number and the current display mode stored in the information storage 21 is the "track number+ title display mode", namely, in the case that the current track number is displayed on the display unit 8, the information access processor 29 instructs the information storage 21 to update the current track number, and instructs the track number display processor 26 to update the display of the information. The track number display processor 26 causes the display unit 8 to display the current track number based on the current track number updated by the information storage 21. That is, the track number display processor 26 updates the current track number displayed on the display unit 8. In the case that the current volume is displayed on the display unit 8, the volume display processor 28 does not update the display of the information even if the current track number is updated. Therefore, the useless processing in which the display processors 26 to 28 update the display of the information although the information is not updated is not generated, and the processing load on the microcomputer 2 acting as the display processors 26 to 28 does not increase.

The key processors 23 to 25 do not determine whether the display mode is the track number+ title display mode or the volume display mode based on the display mode stored in the information storage 21. In the case that the key processors 23 to 25 are applied to a device that does not switch between the track number+ title display mode and the volume display mode, it is not necessary to modify the program causing the hardware (for example, the microcomputer) to act as the key processor. Accordingly, the program causing the hardware to act as the key processor has high flexibility.

In the embodiment, in the case that the display switching key processor 23 instructs to update the current display mode, the information access processor 29 instructs the information storage 21 to update the display mode, and instructs one of the display processors 26 to 28 to update the display of the information. The display processors 26 to 28 cause the display unit 8 to display the current track number or the current volume based on the display mode updated by the information storage 21. That is, when the information storage 21 updates the current display mode from the track number+ title display mode to the volume display mode, the volume display processor 28 causes the display unit 8 to display the current volume based on the updated information of the display mode. When the information storage 21 updates the current display mode from the volume display mode to the track number+ title display mode, the track number display processor 26 causes the display unit 8 to display the current track number based on the updated information of the display mode. That is, the CD player 1 receives the operation of the display switching key 91 to switch between the current track number displayed on the display unit 8 and the current volume displayed on the display unit 8. Accordingly, the user can switch and confirm the current track number and the current volume by operating the display switching key 91.

Although the embodiment of the present invention is described above, the present invention is not limited to the embodiment. As illustrated below, various changes can properly be made without departing from the scope of the present invention.

In the embodiment, the display processors 26 to 28 are constructed with the track number display processor 26, the title display processor 27, and the volume display processor 28. Alternatively, one display processor may cause the display unit 8 to display the track number, the title, and the volume. Alternatively, the display processors 26 to 28 may be constructed with a display processor of track number+title that causes the display unit 8 to display the track number and the title and a volume display processor that causes the display unit 8 to display the volume.

In the embodiment, based on the management table in FIG. 6, the information access processor 29 may determine whether the information access processor 29 instructs the display processors 26 to 28 to update the display of the information, and determine to which of the display processors 26 to 28 the information access processor 29 instructs to update the display of the information. Alternatively, the information access processor 29 does not include the management table, but the information access processor 29 may make the above determination based on the display information that the information access processor 29 instructs the information storage 21 to update and the current display mode acquired from the information storage 21.

In the embodiment, the key processors 23 to 25 acquire the display information from the information storage 21 through the information access processor 29. Alternatively, the key processors 23 to 25 may acquire the display information from the information storage 21 with no use of the information access processor 29.

The case that the display device of the present invention is applied to the CD player is described in the embodiment. Alternatively, the display device of the present invention can be applied to music playback devices such as an MD player, a DVD player, and an HDD player and an AV amplifier as long as the display device includes the display unit displaying the information.

The present invention can suitably used in the display device provided with the display unit displaying the information.

What is claimed is:

1. A display device comprising:
a display unit that displays information;
an operation unit for receiving operation of an instruction to update the information;
an information storage in which display information to display the information is stored;
a display processor that causes the display unit to display the information on a basis of the display information stored in the information storage;
an operation processor that receives operation of the operation unit and instructs to update the display information; and
an information access processor that instructs the information storage to update the display information, and instructs the display processor to update the display of the information, in case that the operation processor instructs to update the display information, wherein
the information storage updates the display information stored therein on the basis of the instruction to update the display information by the information access processor,
the display processor causes the display unit to display the information based on the display information updated by the information storage in case that the information access processor instructs to update the display of the information,
the display unit displays the information including first information and second information,
the operation unit includes a first operation unit for receiving operation of an instruction to update the first information;
the display information is stored in the information storage, the display information including first display information to display the first information, second display information to display the second information, and third display information, the third display information indicating one of a first display mode in which the first information is displayed on the display unit and a second display mode in which the second information is displayed on the display unit,
the display processor causes the display unit to switch and display the first information based on the first display information and the second information based on the second display information on the basis of the third display information stored in the information storage,
the operation processor receives operation of the first operation unit, and instructs the information storage to update the first display information,
the information access processor instructs the information storage to update the first display information, and instructs the display processor to update the display of the information, in case that the operation processor instructs to update the first display information, and the third display information stored in the information storage is the first display mode, and does not instruct the display processor to update the display of the information in case that the operation processor instructs to update the first display information and the third display information stored in the information storage is the second display mode,
the information storage updates the first display information stored therein on the basis of the instruction to update the first display information by the information access processor, and
the display processor causes the display unit to display the first information based on the first display information updated by the information storage when the information access processor instructs to update the display of the information.

2. The display device according to claim 1, wherein the operation unit further includes a second operation unit for receiving operation to switch between the display of the first information and the display of the second information,
the operation processor receives operation of the second operation unit, and instructs to update the third display information,
the information access processor instructs the information storage to update the third display information, and instructs the display processor to update the display of the information, in case that the operation processor instructs to update the third display information, the information storage updates the third display information stored therein on the basis of the instruction to update the third display information by the information access processor, and the display processor causes the display unit to display one of the first information and the second information on the basis of the third display information updated by the information storage in case that the information access processor instructs to update the display of the information.

3. The display device according to claim 1, wherein the first display information comprises a track and a title, the second display information comprises a volume, the first display mode displays the track and title on the display unit, and the second display mode displays the volume on the display unit.

* * * * *